United States Patent
Hinrichs et al.

(10) Patent No.: US 8,024,981 B2
(45) Date of Patent: Sep. 27, 2011

(54) DEVICE FOR TEST LOADING

(75) Inventors: Rolf Hinrichs, Hamburg (DE); Christian Goepel, Buchholz (DE); Uwe Matschl, Hamburg (DE); Stephan Christiansen, Helmste (DE)

(73) Assignee: Airbus Operations GmbH, Hamburg (DE)

( * ) Notice: Subject to any disclaimer, the term of this patent is extended or adjusted under 35 U.S.C. 154(b) by 191 days.

(21) Appl. No.: 12/427,099

(22) Filed: Apr. 21, 2009

(65) Prior Publication Data

US 2009/0260449 A1 Oct. 22, 2009

Related U.S. Application Data

(60) Provisional application No. 61/124,986, filed on Apr. 21, 2008.

(51) Int. Cl.
*G01M 5/00* (2006.01)
(52) U.S. Cl. .......................................................... 73/802
(58) Field of Classification Search ...................... 73/802
See application file for complete search history.

(56) References Cited

U.S. PATENT DOCUMENTS

| | | | | | |
|---|---|---|---|---|---|
| 2,151,584 | A | * | 3/1939 | Bugatti | 73/796 |
| 2,383,491 | A | * | 8/1945 | Kemmer et al. | 73/798 |
| 2,396,380 | A | | 3/1946 | Longley | |
| 2,425,273 | A | * | 8/1947 | Watter | 73/802 |
| 4,061,015 | A | * | 12/1977 | Fish | 73/49.5 |
| 5,065,630 | A | * | 11/1991 | Hadcock et al. | 73/802 |
| 5,113,079 | A | * | 5/1992 | Matulka | 250/550 |
| 5,379,645 | A | * | 1/1995 | Smart | 73/794 |
| 5,425,276 | A | * | 6/1995 | Gram et al. | 73/816 |
| 5,712,431 | A | * | 1/1998 | Vilendrer | 73/841 |
| 6,035,715 | A | * | 3/2000 | Porter | 73/571 |

(Continued)

FOREIGN PATENT DOCUMENTS

DE 197 27 754 1/1999

(Continued)

OTHER PUBLICATIONS

Office action in German application 10 2008 020 125.1-51.

(Continued)

*Primary Examiner* — Lisa Caputo
*Assistant Examiner* — Jonathan Dunlap
(74) *Attorney, Agent, or Firm* — Greer, Burns & Crain, Ltd.

(57) ABSTRACT

The present invention provides a device for test loading a fuselage barrel, in particular in the aviation and aerospace industry. The device comprises a first and a second pressure bulkhead for sealing the fuselage barrel at the end faces thereof in a pressure-tight manner. The device further comprises a support device which may be coupled to the first pressure bulkhead, on the one hand, and to the second pressure bulkhead, on the other hand, extending through the fuselage barrel. Moreover, the device comprises a loading device which may be coupled to the support device, on the one hand, and to a portion of the fuselage barrel, on the other hand, for introducing loads into the fuselage barrel. The resulting advantage is that gravitational force and/or acceleration forces acting on the masses arranged in the fuselage barrel, for example cargo, in particular during the flight phase may be simulated by means of components which are exclusively arranged within the fuselage barrel, which is pressurized during the test. Thus a provision of through-holes in the fuselage skin for passing through hydraulic cylinders and the sealing of said holes relative to the fuselage skin, as in the device known to the applicant, are avoided.

10 Claims, 2 Drawing Sheets

U.S. PATENT DOCUMENTS

| | | | |
|---|---|---|---|
| 6,298,729 B1* | 10/2001 | Locker et al. | 73/668 |
| 6,598,486 B2* | 7/2003 | Vilendrer et al. | 73/841 |
| 7,155,982 B2* | 1/2007 | Oesmann et al. | 73/841 |
| 7,421,906 B2* | 9/2008 | Saves-Saint-Germes | 73/802 |
| 7,426,871 B2* | 9/2008 | Saves-Saint-Germes et al. | 73/802 |
| 7,624,695 B2 | 12/2009 | Götze | |
| 7,628,056 B2* | 12/2009 | Krah | 73/49.5 |
| 2002/0170361 A1* | 11/2002 | Vilendrer et al. | 73/849 |
| 2003/0043964 A1 | 3/2003 | Sorenson | |
| 2005/0109118 A1* | 5/2005 | Oesmann et al. | 73/841 |
| 2007/0022821 A1 | 2/2007 | Saves-Saint-Germes | |
| 2007/0068275 A1 | 3/2007 | Saves-Saint-Germes | |

FOREIGN PATENT DOCUMENTS

| | | |
|---|---|---|
| DE | 10 2006 015 642 | 10/2007 |
| WO | WO 2005/082604 | 9/2005 |

OTHER PUBLICATIONS

Michael C. Y. Niu, "Airframe Structural Design", Conmilit Press Ltd., 1988.

* cited by examiner

DEVICE FOR TEST LOADING

CROSS REFERENCE TO RELATED APPLICATIONS

This application claims the benefit of U.S. Provisional Application No. 61/124,986, filed Apr. 21, 2008, the entire disclosure of which is herein incorporated by reference.

FIELD OF THE INVENTION

The present invention relates to a device for test loading a fuselage barrel, in particular in the aviation and aerospace industry.

The test loading of fuselage barrels, in particular with regard to their fatigue strength, is essential in order to ensure the safety of aircraft.

BACKGROUND OF THE INVENTION

When test loading fuselage barrels, there is the requirement for said fuselage barrels to be pressurised. Moreover, there is the further requirement to simulate gravitational force and/or acceleration forces acting on the masses, for example passengers or cargo, located in the fuselage barrel.

An approach known to the applicant for test loading, therefore, provides that a fuselage barrel is configured with radial recesses, through which hydraulic cylinders are passed which, on the one hand, act on a frame arranged outside the fuselage barrel and, on the other hand, on the cargo deck and/or passenger deck of the fuselage barrel.

With this approach which is known to the applicant, it has proved disadvantageous that the recesses initially have to be provided in the fuselage barrel, which is associated with a considerable cost. Moreover, it has also proved to be disadvantageous that the hydraulic cylinders and/or the piston rods thereof have to be sealed relative to the fuselage skin by means of sealing collars, in order to prevent pressure escaping from the fuselage barrel. This is also associated with a considerable cost.

It is therefore the object of the present invention to avoid the disclosed drawbacks above.

According to the invention, this object is achieved by a device having the features of claim 1.

Accordingly, a device is provided for test loading a fuselage barrel, in particular in the aviation and aerospace industry. Said device comprises a first and a second pressure bulkhead for sealing the fuselage barrel at the end faces thereof in a pressure-tight manner. The device further comprises a support device which may be coupled to the first pressure bulkhead, on the one hand, and to the second pressure bulkhead, on the other hand, extending through the fuselage barrel. Moreover, the device comprises a loading device which may be coupled to the support device, on the one hand, and to a portion of the fuselage barrel, on the other hand, for introducing loads into the fuselage barrel.

The idea underlying the present invention is that the means required for simulating the loads which result from the masses arranged in the fuselage barrel and act on the fuselage barrel, are arranged inside and not outside the fuselage barrel, as in the approach known to the applicant. Thus the requirement of providing the radial recesses in the fuselage skin, as disclosed above, is also dispensed with. Moreover, the requirement of sealing the hydraulic cylinders relative to the fuselage skin, which is costly, is also dispensed with. Thus, by means of the device according to the invention, the desired test loading of the fuselage barrel costs considerably less.

Advantageous embodiments and improvements of the invention are set forth in the sub-claims.

According to a preferred development of the device according to the invention, the support device may be coupled by means of a fixed bearing to the first pressure bulkhead and by means of a loose bearing to the second pressure bulkhead. Thus a distortion between the support device and the fuselage barrel is avoided, i.e. the fuselage barrel may freely deform, for example in bending tests, without bending moments in the region of the coupling points between the support device and the pressure bulkhead being introduced therein. Thus the forces which act in reality may be easily adjusted.

According to a further preferred development of the device according to the invention, the support device comprises a first beam, a second beam and struts coupling said beams. In particular, the first beam, second beam and the struts form a framework. Such a structure provides the support device with the desired rigidity, in spite of the comparatively large distance between the first and second pressure bulkhead.

According to a further preferred development of the device according to the invention, the loading device comprises at least one adjusting member for acting on the first or second beam and a deck of the fuselage barrel.

According to a further preferred development of the device according to the invention, the loading device comprises at least one adjusting member for acting on the first beam and a lower deck of the fuselage barrel and at least one adjusting member for acting on the second beam and the upper deck, the first beam being able to be coupled to the pressure bulkheads. Thus the first beam may be configured to extend relatively precisely along the centre line (longitudinal direction) of the fuselage barrel. Thus the length of the adjusting members, in particular of a piston of a hydraulic cylinder, may be kept relatively small. The adjusting members are preferably configured as hydraulic cylinders.

Preferably, a third beam is a component of the framework, which extends laterally offset to the second beam and is also coupled to the first beam by means of struts. The at least one adjusting member may therefore be arranged such that it is fastened to the first adjusting member and passes through the second and third adjusting member in order to be coupled to one of the decks, in particular the lower deck.

According to a further preferred development of the device according to the invention, the loading device comprises at least one load distribution means which connects the at least one adjusting member to the upper or lower deck, the load distribution means comprising a ramified structure. The term "ramified structure" means that a first component comprises the entire force flux and a plurality of second components are coupled to said component, which respectively comprise a fraction of the force flux, and preferably said second components are respectively coupled to third components, which in turn comprise a fraction of the force flux in the respective second component. The first, the second and preferably third components are thus respectively configured to be adapted to the force flux which flows therein, with regard to their stability. Thus the load distribution means may be produced relatively easily and advantageously.

According to a further preferred development of the device according to the invention, a retaining device is provided which keeps the pressure bulkheads movable relative to one another. Thus the actual conditions to which a fuselage barrel is subjected may be easily adjusted.

According to a further preferred development of the device according to the invention, the retaining device comprises a frame in which one of the pressure bulkheads is fixedly clamped and at least one adjusting means which is coupled to the frame and the other respective pressure bulkhead. As a result of the adjusting means, the loads which occur, for example in the flight phase, may be easily introduced into the fuselage barrel.

BRIEF DESCRIPTION OF THE DRAWINGS

The invention is described hereinafter in more detail with reference to embodiments and with reference to the accompanying figures, in which.

In the figures, like reference numerals denote like or functionally equivalent components, unless stated otherwise.

DETAILED DESCRIPTION OF THE DRAWINGS

Figure 1:
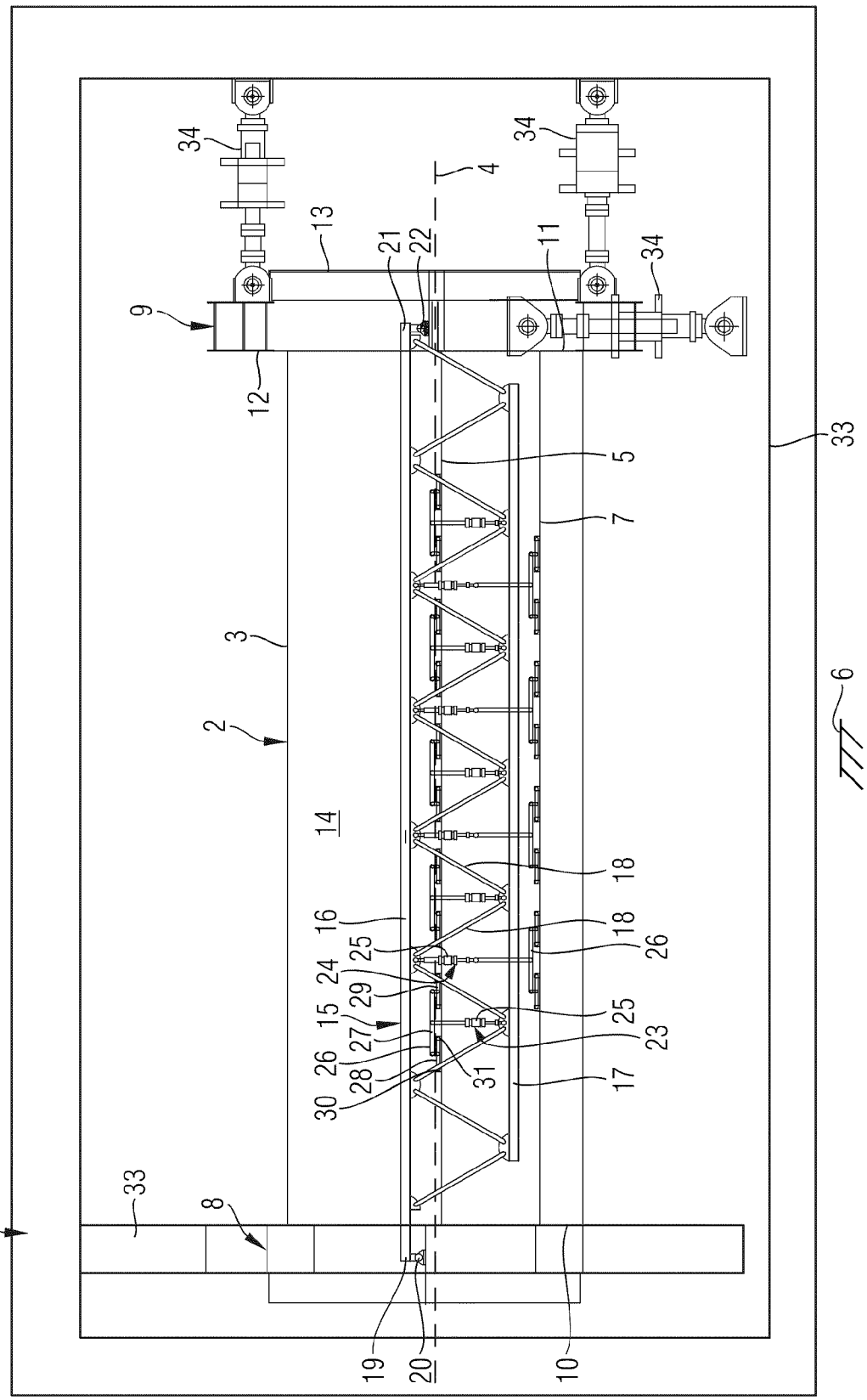
FIG. 1 shows a side view of a device according to a preferred embodiment of the present invention.

FIG. 1 shows a side view of a device 1 for test loading a fuselage barrel 2.

The fuselage barrel 2 is made up of a skin 3 and possibly stringers and formers (not shown). Moreover, the fuselage barrel 2 comprises a passenger deck 5 in the vicinity of its centre line 4. Relative to the ground 6, shown for the sake of better orientation, the fuselage barrel 2 has a cargo deck 7 arranged below the passenger deck 5.

The device 1 has two pressure bulkheads 8, 9 which seal the fuselage barrel 2 at the end faces 10, 11 thereof in a pressure-tight manner. To this end, the pressure bulkheads 8, 9 may be connected, in particular welded, to the end faces 10 and/or 11 of the fuselage barrel 2 in a first step. In a further step, the fuselage barrel 2 connected to the pressure bulkheads 8, 9 is then conveyed into the device 1 and installed there.

The pressure bulkheads 8, 9 are respectively made up of a force introduction part 12 (hereinafter only explained in more detail for the pressure bulkhead 9), which is connected to the end face 11 of the fuselage barrel 2, and a cover 13. The cover 13 is configured to be removable, so that access may be permitted into the interior 14 of the fuselage barrel 2.

The device 1 also has a support device 15. The support device 15 is made up of a beam 16, a beam 17 and struts (for example denoted by the reference numeral 18). The struts 18 connect the beam 16 to the beam 17 and are therefore arranged obliquely, so the support device 15 forms a frame-like structure.

The beam 16 is preferably arranged so as to extend in the vicinity of the centre line 4 of the fuselage barrel 2 and at its one end 19 is coupled by means of a fixed bearing 20 to the pressure bulkhead 8 and at its other end 21 by means of a loose bearing 22 to the pressure bulkhead 9.

Whilst the fixed bearing 20 does not permit a translatory movement but merely a rotational movement, the loose bearing 22 permits a translatory movement in addition to the rotational movement, the translatory movement being restricted to a movement which is substantially parallel to the centre line 4.

The device 1 also has loading devices (for example denoted by the reference numerals 23 and 24) which are arranged during tests within the fuselage barrel 2. Preferably 4 to 10 of the loading devices 23 and 4 to 10 of the loading devices 24 are provided and distributed uniformly along the beams 16 and/or 17.

The loading device 23 is preferably made up of a hydraulic cylinder 25 and a load distribution means 26. The hydraulic cylinder 25 is at its one end connected to the beam 17 and at its other end to the load distribution means 26. The load distribution means 26 is, in turn, connected to the passenger deck 4. The load distribution means 26 is made up of a first element 27 and a second element 28, 29. Proceeding from the location where the hydraulic cylinder 25 joins the element 27, the force flux in the first element 27 is split and is respectively divided into half onto the second elements 28 and 29 at their coupling points with the element 27. The elements 28 and 29, in turn, introduce the force flux into the passenger deck 5 respectively at two locations 30 and 31 spaced apart from one another. The locations 30 and 31 of the passenger deck 4 are preferably formed from seat rails. The elements 27, 28 and 29 are thus respectively adapted to the force flux which flows therein with regard to their material thickness and/or type of material.

The loading device 24 is also made up of a hydraulic cylinder 25 and a load distribution means 26. The loading device 24 thus connects the beam 17 to the cargo deck 7.

In an alternative embodiment, it may also be provided that only one of the two "types" of loading devices 23 or 24 is provided.

Figure 2:
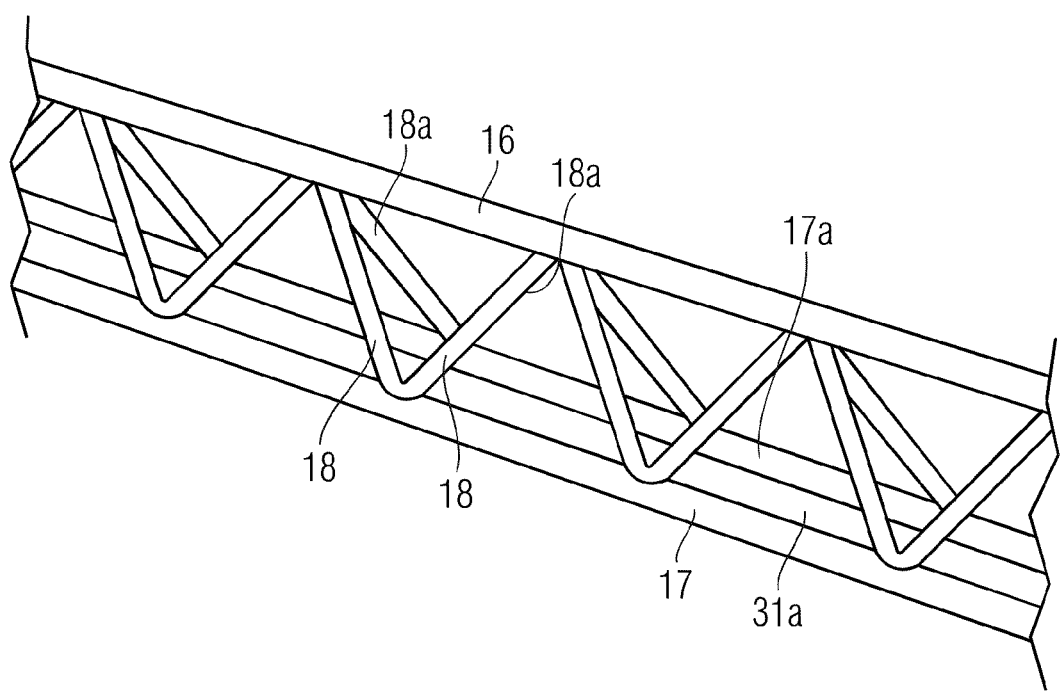
FIG. 2 shows a perspective view of a portion of a framework structure of FIG. 1.

Preferably, the framework structure shown in FIG. 1 is configured as shown in FIG. 2. Accordingly, a beam 17a is again provided which runs laterally offset to the beam 17, i.e. offset in a plane parallel to the ground 6. The beam 17a is also coupled by means of struts 18a to the beam 16, the struts 18 and 18a preferably being connected to the beam 16 by converging substantially at one location. As a result of the intermediate region 31a which is formed, the hydraulic cylinders 24 extend from the beam 16 to the cargo deck 7 (not shown in FIG. 2). Thus a support device 15 is obtained which has a high degree of torsional rigidity.

The device 1 further comprises a retaining device 32. The retaining device 32 is made up of a frame 33 and hydraulic cylinders 34. The pressure bulkhead 8 is fixedly clamped in the frame 33. The load introduction part 12 of the pressure bulkhead 9 is, however, coupled by means of the hydraulic cylinders 34 to the frame 33.

In order to test load the fuselage barrel, said fuselage barrel is pressurised with an internal pressure by means of a pressurising device, not shown. Subsequently, the hydraulic cylinders 25 of the loading devices 23 and 24 are activated, so a load acts on the passenger deck 5 and the cargo deck 7, which load is oriented towards the ground 6. Thus the gravitational forces and/or acceleration forces acting in the fuselage barrel, which for example occur in an aircraft during the flight phase, are simulated in an appropriate manner. Additionally, forces, bending moments, and torsional moments, for example, may be introduced into the fuselage barrel 2 via the hydraulic cylinders 34.

The present invention provides a device for test loading a fuselage barrel, in particular in the aviation and aerospace industry. The device comprises a first and a second pressure bulkhead for sealing the fuselage barrel at the end faces thereof in a pressure-tight manner. The device further comprises a support device which may be coupled to the first pressure bulkhead, on the one hand, and to the second pressure bulkhead, on the other hand, extending through the fuselage barrel. Moreover, the device comprises a loading device which may be coupled to the support device, on the one hand, and to a portion of the fuselage barrel, on the other hand, for introducing loads into the fuselage barrel. The resulting advantage is that gravitational force and/or acceleration forces acting on the masses arranged in the fuselage barrel, for example cargo, in particular during the flight phase may be simulated by means of components which are exclusively arranged within the fuselage barrel, which is pressurised during the test. Thus a provision of through-holes in the fuselage skin for passing through hydraulic cylinders and the sealing of said holes relative to the fuselage skin, as in the device known to the applicant, are avoided.

The invention claimed is:

1. Device for test loading a fuselage barrel in the aviation and aerospace industry, comprising:
    a first and second pressure bulkhead for sealing the fuselage barrel at the end faces thereof in a pressure-tight manner;
    a support device coupled to the first pressure bulkhead, on the one hand, and to the second pressure bulkhead, on the other hand, extending through the fuselage barrel; and
    a loading device coupled to the support device inside the fuselage barrel, on the one hand, and to an inside portion of the fuselage barrel, on the other hand, for introducing loads into the fuselage barrel from inside the fuselage barrel.

2. Device according to claim 1, wherein the support device may be coupled by means of a fixed bearing to the first pressure bulkhead and by means of a loose bearing to the second pressure bulkhead.

3. Device according to claim 1, wherein the support device comprises a first beam, a second beam and struts coupling said beams.

4. Device according to claim 3, wherein the first beam, the second beam and the struts form a framework.

5. Device according to claim 3, wherein the loading device comprises at least one adjusting member for acting on the first beam and a lower deck of the fuselage barrel and at least one adjusting member for acting on the second beam and the upper deck, the first beam being able to be coupled to the pressure bulkheads.

6. Device according to claim 5, wherein the loading device comprises at least one load distribution means which connects the at least one adjusting member to the upper or lower deck, the load distribution means comprising a ramified structure.

7. Device according to claim 1, wherein a retaining device is provided which keeps the pressure bulkheads movable relative to one another.

8. Device according to claim 7, wherein the retaining device comprises a frame, into which one of the pressure bulkheads is fixedly clamped, and at least one adjusting means which is coupled to the frame and the other respective pressure bulkhead.

9. A device for test loading a fuselage barrel in the aviation and aerospace industry, comprising:
    a first and second pressure bulkhead for sealing the fuselage barrel at the end faces thereof in a pressure-tight manner;
    a support device coupled to the first pressure bulkhead and to the second pressure bulkhead and extending through the fuselage barrel; and
    a loading device coupled to the support device and to a portion of the fuselage barrel, for introducing loads into the fuselage barrel;
    wherein the loading device comprises at least one adjusting member for acting on the first beam and a lower deck of the fuselage barrel and at least one adjusting member for acting on the second beam and the upper deck, the first beam being able to be coupled to the pressure bulkheads.

10. The device according to claim 9, wherein the loading device comprises at least one load distribution means which connects the at least one adjusting member to the upper or lower deck, the load distribution means comprising a ramified structure.

* * * * *